May 31, 1966 A. SCHMERMUND 3,253,387
PACKING MACHINES
Filed Feb. 14, 1963 11 Sheets-Sheet 1

INVENTOR:
ALFRED SCHMERMUND
BY: Nolte & Nolte
ATTORNEYS

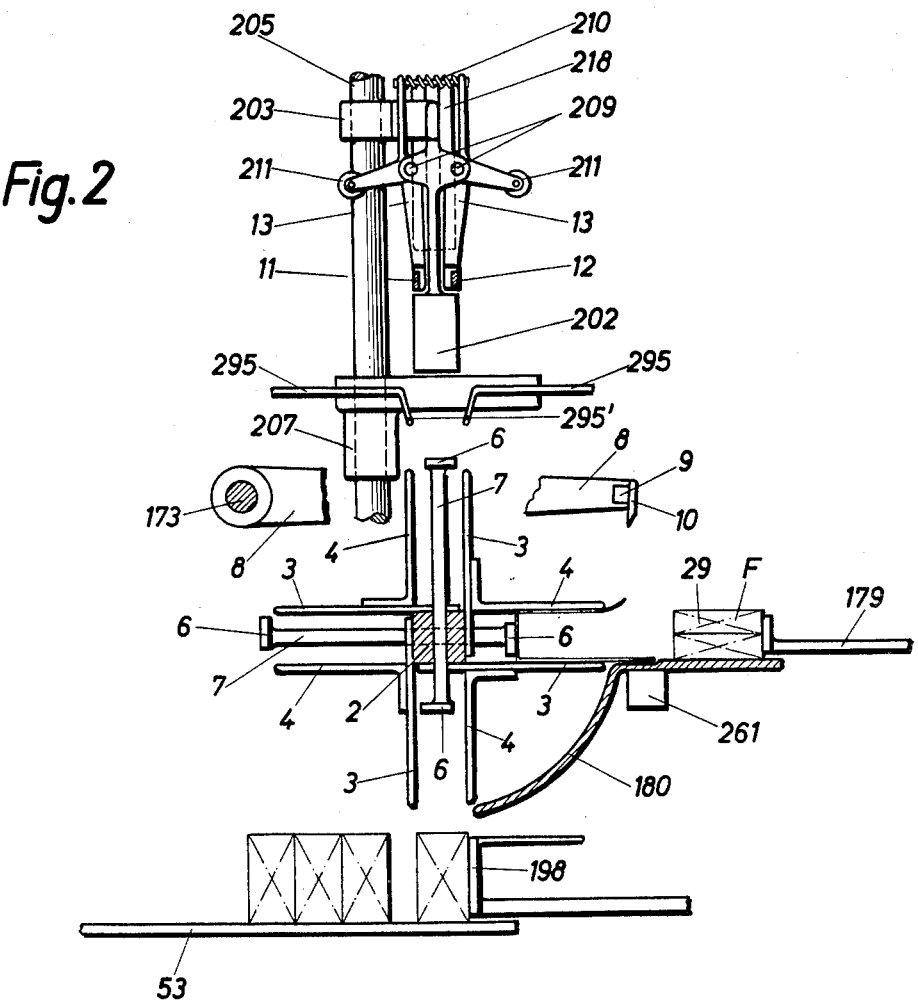

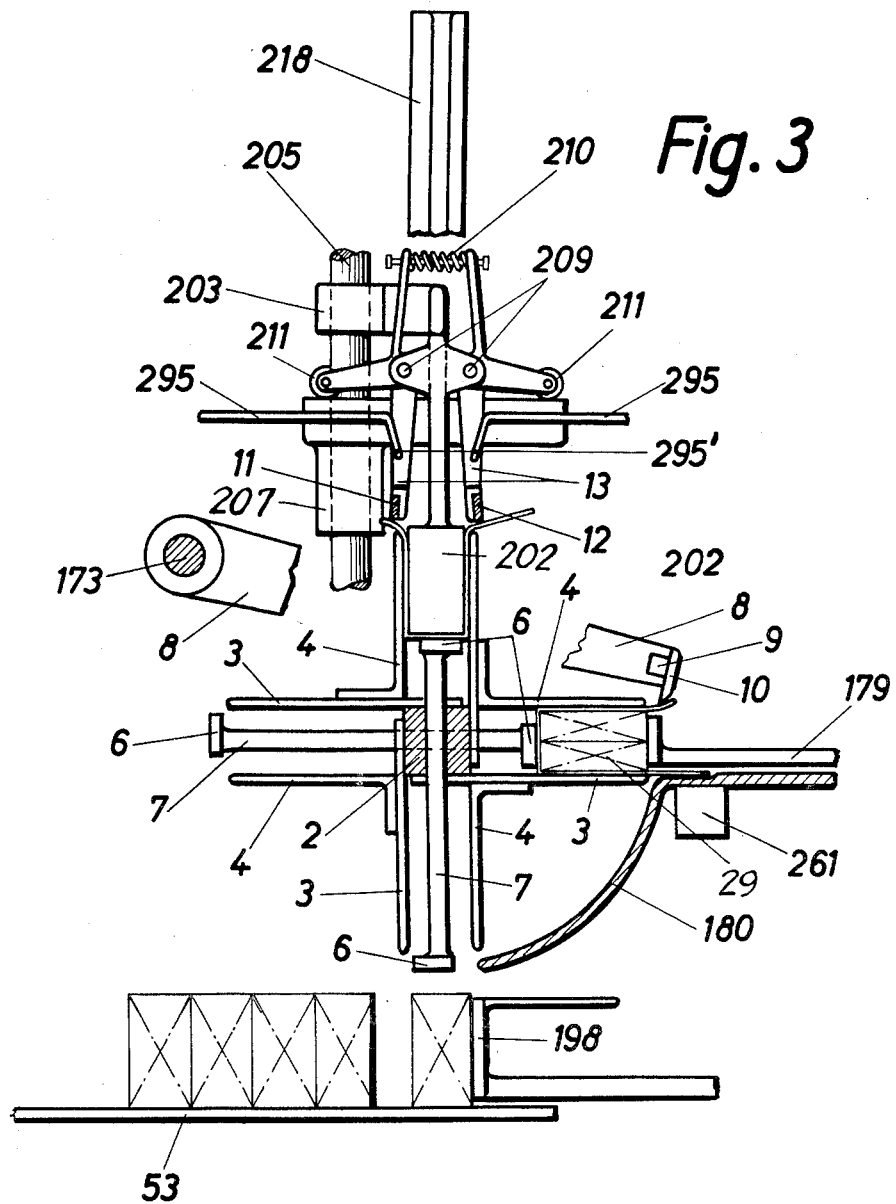

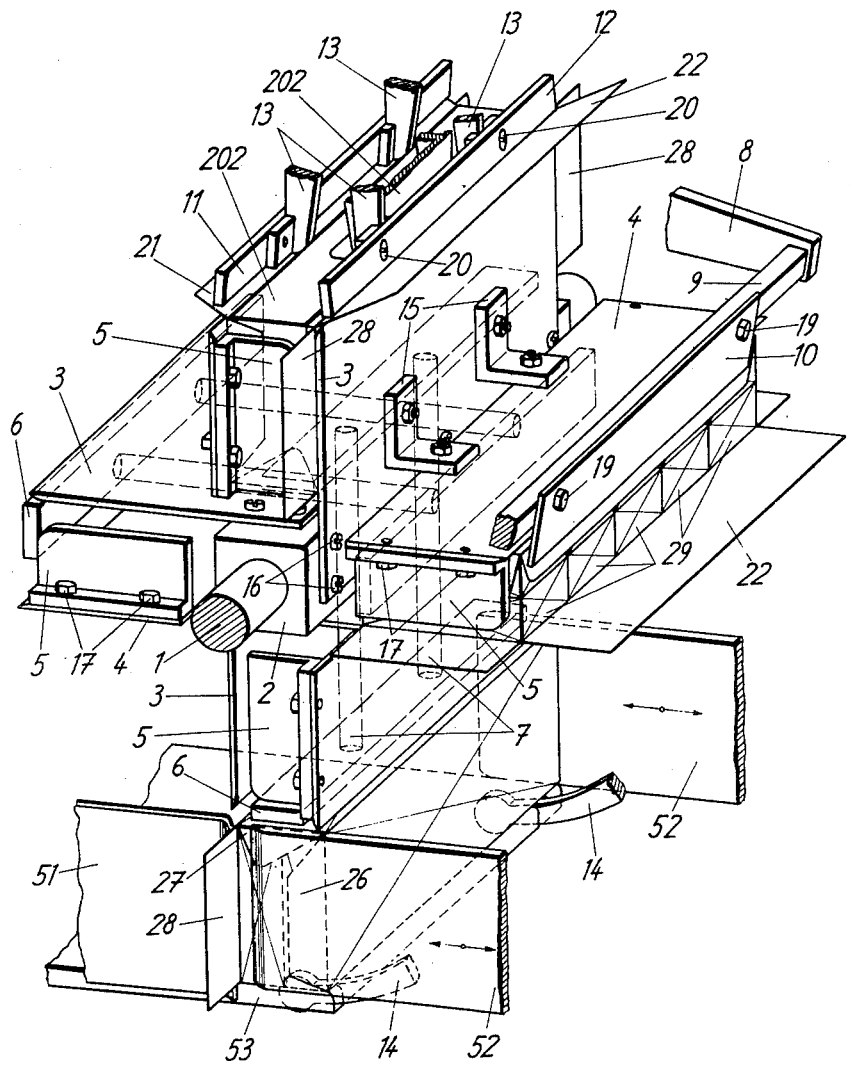

May 31, 1966 A. SCHMERMUND 3,253,387
PACKING MACHINES
Filed Feb. 14, 1963 11 Sheets-Sheet 5
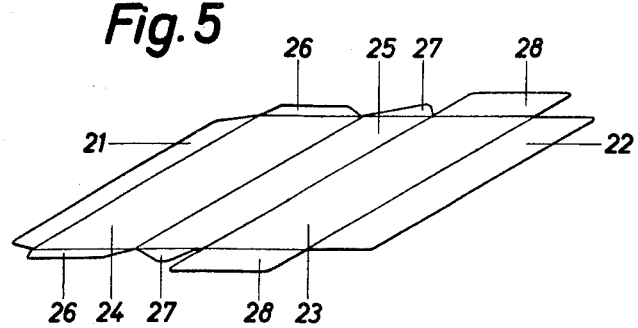
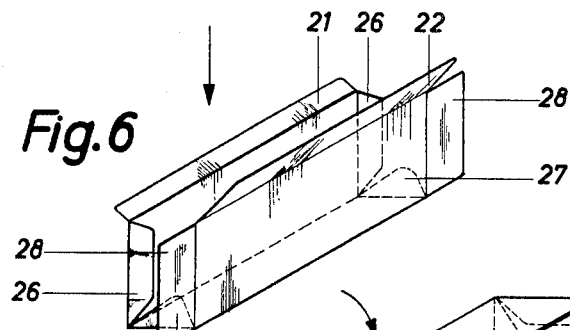
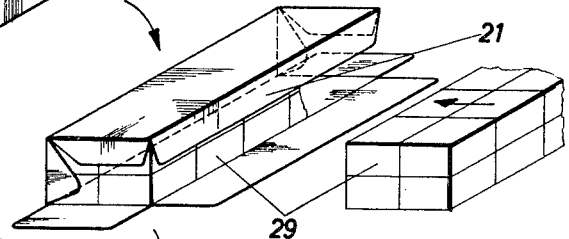
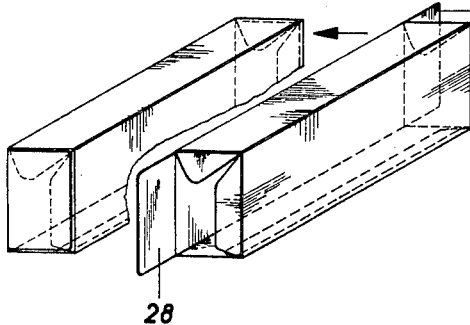
INVENTOR:
ALFRED SCHMERMUND
BY: Nolte & Nolte
ATTORNEYS May 31, 1966 A. SCHMERMUND 3,253,387
PACKING MACHINES
Filed Feb. 14, 1963 11 Sheets-Sheet 7

INVENTOR:
ALFRED SCHMERMUND
BY: Nolte & Nolte
ATTORNEYS

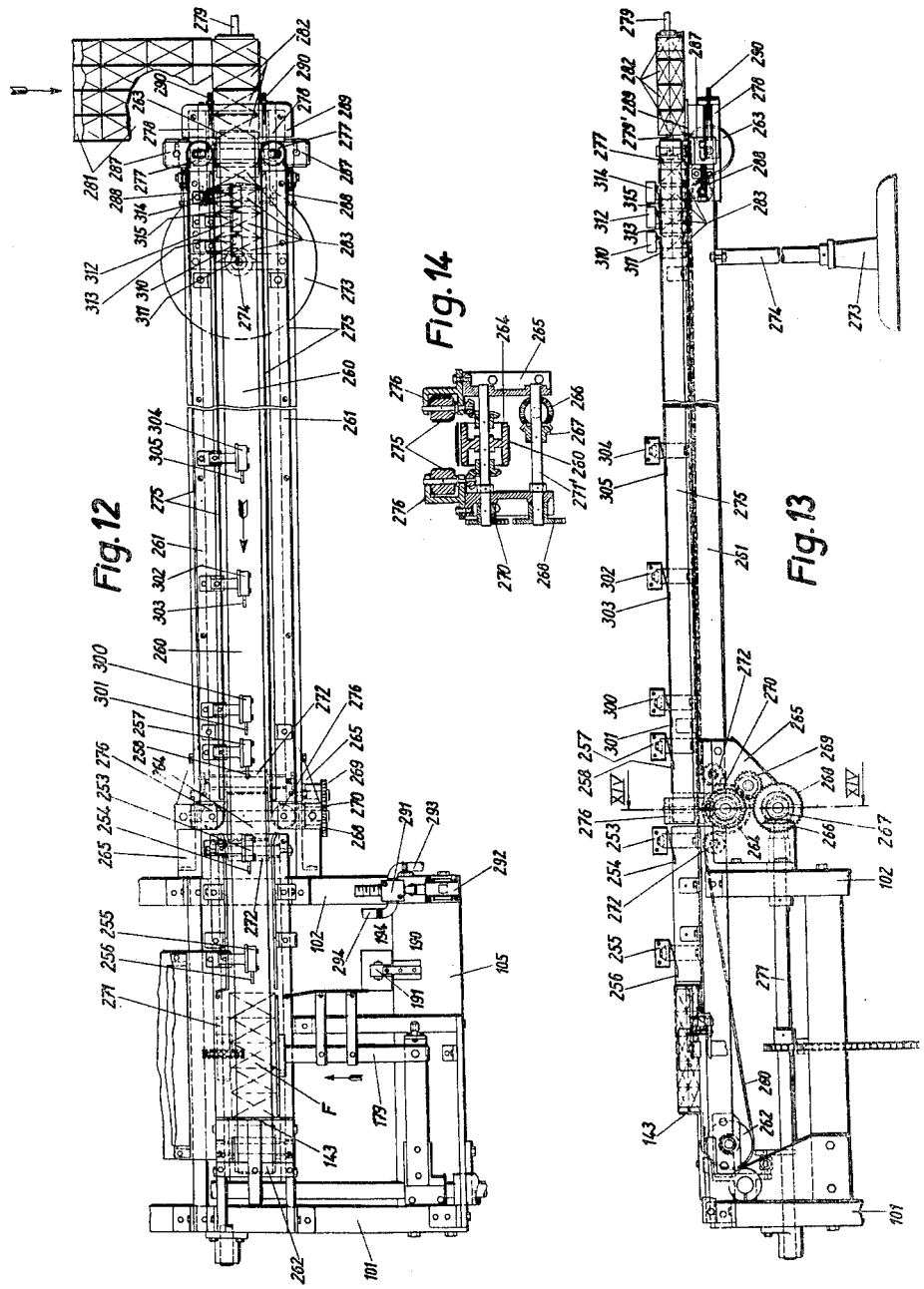

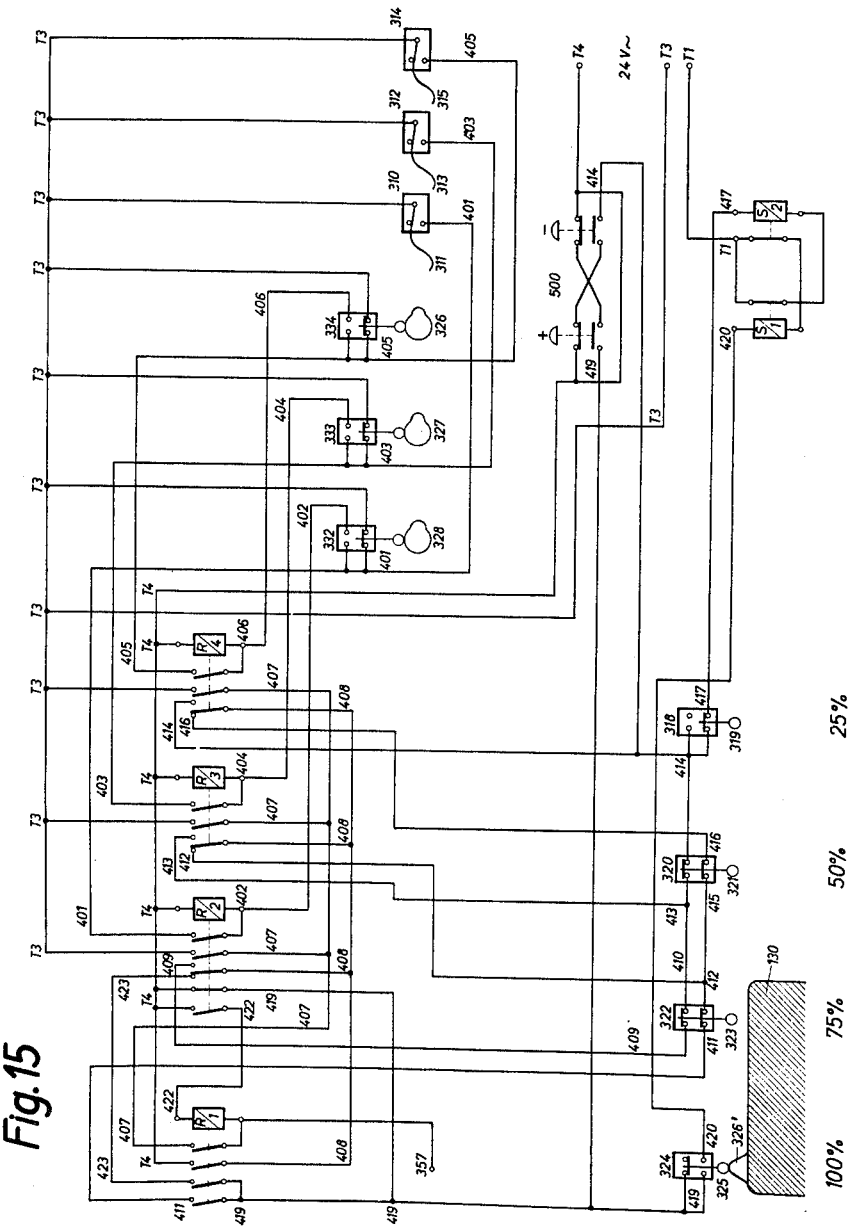

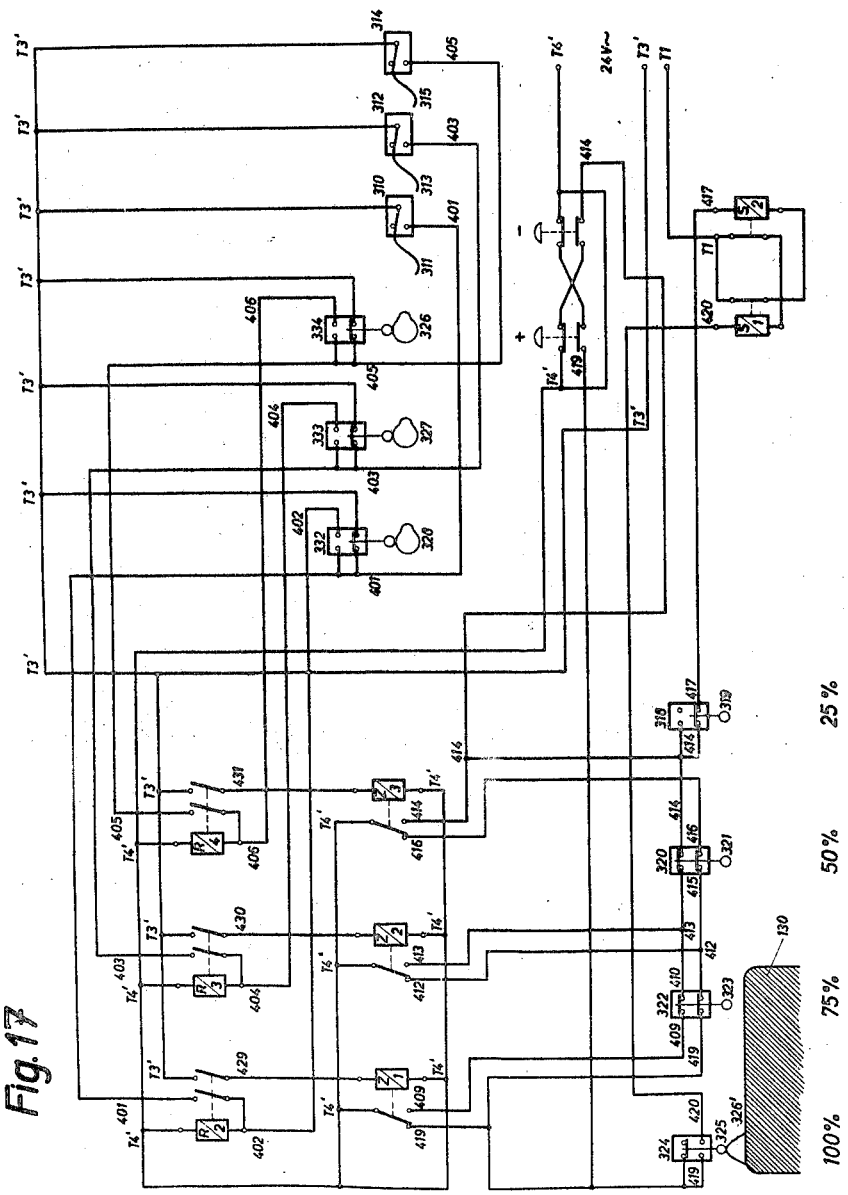

United States Patent Office 3,253,387
Patented May 31, 1966

3,253,387
PACKING MACHINES
Alfred Schmermund, 62 Kornerstrasse, Gevelsberg, Westphalia, Germany
Filed Feb. 14, 1963, Ser. No. 258,478
3 Claims. (Cl. 53—234)

The invention relates to a device for packing articles in cartons. More specifically, the invention relates to a device for packing packets of cigarettes in groups of a predetermined number of packets, in cartons.

It has been proposed to pack groups of packets, referred to hereinafter as a block of packets, in cartons by feeding a carton blank to an apertured folding station and pushing the block of packets against the carton blank in such a manner that it enters the aperture, pushing before it a central region of the carton blank, the carton blank thus being folded about the block of packets into a U-shaped form. It has also been proposed to carry out a similar procedure using cells of a stepwise rotatable turret instead of the above mentioned folding station.

In both of these proposed procedures the packets of the block are required to exert force on the carton blank and are thus liable to damage, or at least liable to damage of the contents of the packets.

It is an object of the present invention to provide a device for packing a plurality of articles into a carton, wherein undue stress on the packets of such blocks or on the contents of the packets is avoided.

It is another object of the invention to provide such a device in which the bending of carton blanks is facilitated.

It is a further object to provide such a device which operates at a high speed and yet is reliable in use.

These and other objects and advantages of the invention will become clear from the following detailed description of an embodiment of the invention when read with reference to the attached drawings, which are given by way of example and in which:

FIG. 2 is a diagrammatic side view, showing part of the device of FIG. 1, in a particular operational position thereof;

FIG. 3 is a diagrammatic side view, showing part of the device of FIG. 1, in another operational position thereof;

FIG. 4 is a perspective view of a turret member of the device of FIG. 1;

FIG. 5 is a perspective view of a carton blank such as is used by the packing device of FIG. 1;

FIGS. 6, 7 and 8 are perspective views illustrating various stages in the folding of the carton blank of FIG. 5, and the provision of cigarette packets therein to form a carton of cigarettes;

FIG. 12 is a plan view of a conveyor device adapted for forming blocks of cigarette packets for feeding to the packing device of FIGS. 1 to 11;

FIG. 13 is a side view of the conveyor device of FIG. 12;

FIG. 14 is a sectional view taken along the line XIV—XIV of FIG. 13;

FIGS. 15 and 16 are circuit diagrams of an electric control arrangement associated with the packing device and conveyor device; and FIG. 17 is a modified form of the circuit diagram of FIG. 15.

Figures 1, 11:
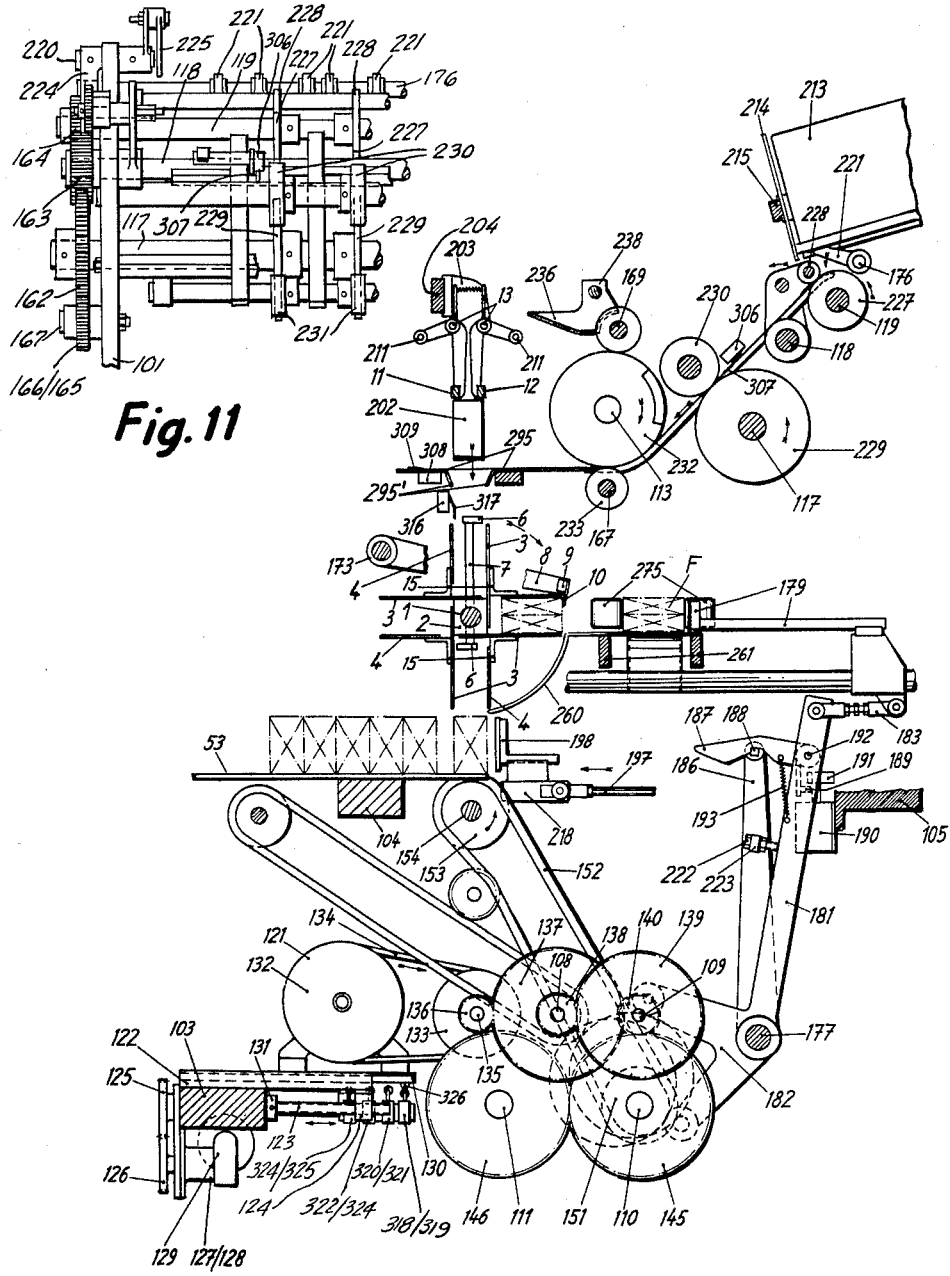
FIG. 1 is a diagrammatic side view of a device for packing predetermined numbers of individual packets of articles, for example cigarettes, in cartons for such packets.
FIG. 11 is a fragmentary view of a detail of the device, taken from the same aspect as FIG. 10, and showing parts of the device not clearly visible in FIG. 10.

The packing device of FIGS. 1 to 11, the conveyor device of FIGS. 12 to 14 and the control arrangement of FIGS. 15 and 16 cooperate in the following manner:

Packets of cigarettes are fed onto a conveyor belt of the conveyor device from a feeder conveyor onto which the packets are fed from a plurality of cigarette packing machines. The presence of packets at various points on the conveyor belt is sensed by micro-switches of the control arrangement and, if the correct sensing signals are given, carton blanks are fed to a turret of the packing device, and a ram is subsequently operated to cause insertion of a group of packets from the conveyor belt into a carton blank which has already been partly shaped in the turret. The group of packets, for example ten packets of cigarettes arranged in two rows of five packets, will hereinafter be referred to as a block of packets.

Packing device

The packing device, the function of which is to pack predetermined numbers of packets of cigarettes, that is to say "blocks" of packets, in cartons, the cartons being formed from carton blanks taken from a magazine, will first be described in broad outline with reference to FIGS. 1 to 8.

The packing device illustrated comprises a four-cell turret member having a shaft 1. The shaft 1 has a thickened part 2 of square cross section and the cells of the turret member are formed by four pairs of plates 3 and 4, the plates 3 being supported on the flats of the square part 2 and the plates 4 being mounted by right-angular brackets 15 bolted to the plates 3. Two pairs of ram bars 6, are provided, one bar 6 being movable in each turret cell, the bars 6 of each pair being connected by two rods 7 guided in transverse bores in the square shaft part 2, the rods 7 of one pair of bars 6 being at right angles to the rods 7 of the other pair of bars 6, but lie in different planes.

The ends of the turret cells are substantially closed by brackets 5, bolted to the plates 4 by bolts 17. The brackets 5 have the function of folding over and holding carton flaps 26, 27 (see FIGS. 4, 5 and 6). Above the turret, two pairs of pivotally mounted levers 13 are provided to which rails 11 and 12 are secured by screws 20, the rails 11 and 12 serving for spreading carton flaps 21 and 22.

At the sides of the turret, above one of the cells thereof when in a horizontal position, two levers 8 are provided which are interconnected by a rail 9, a plate 10 being secured to the rail 9 by screws 19. Below the lowermost cell a pair of carton supporting levers 14 is provided, together with a guide plate 53 for the carton, lateral plates 51 secured to the plate 53 and serving for folding carton flaps 28, and a pair of plates 52 movable to and fro in the direction of the arrows shown thereon in FIG. 4, the plates 52 serving for indenting a folding line for the flaps 28.

The packing device, so far described, operates as follows:

A carton blank shown in FIG. 5, has main body portions 23, 24 and 25, which are intended to be formed into a U-shaped formation, end flaps 26, 27 and 28, and body portion flaps 21 and 22. The carton blank is fed above an uppermost cell of the turret, the turret being movable in intermittent steps of 90° each, into such a position that the portion 25 of the blank overlies the entrance to the uppermost cell. A ram 202 is then moved downwards, pressing the carton blank into the turret cell in such a manner that the body portions 23, 24 and 25 of the blank take up the shape of a U in the cell. The levers 13 are mounted on an operating arm 203 of the ram 202, the levers 13 being movable away from each other, against the action of a spring 210, by the engagement of rollers 211 carried by the levers 13 against an abutment surface formed by an extension of a bearing 207 in which an operating rod 205 for the ram 202 is guided. The spreading of the rails 11 and 12 by the levers 13 is effected only after the carton blank has been given the U-shape form in the turret cell, the rails 11 and 12 bending the flaps 21 and 22 of the carton outwardly and thus weakening the fibrous resistance of these flaps in preparation for a subsequent inward folding operation. During the formation of the carton blank into the U-shape, the end flaps 26 and 27 are engaged by the brackets 5 and folded into the position shown in FIG. 6.

The ram 202 is then removed from the uppermost cell and the turret rotated by 90° so that the cell into which the carton blank was inserted, assumes a horizontal position, this position being shown in FIG. 2. A block of packets of cigarettes 29 is then inserted into the carton in the horizontal cell by a ram 179, and the levers 8 are operated to cause downward folding of the flap 21 by means of the folding plate 10. The turret is then rotated by a further 90° step, during which the flap 22 slides along a curved plate 180 and is thus inwardly folded so as to overlie the flap 21.

The cell in question has thus reached a vertical position, with its open end downwards, and the contents of the cell are prevented from falling out by the carton supporting levers 14. When a new blank is introduced into the uppermost cell by means of the ram 202, the uppermost ram bar 6, acting through the connecting rods 7, causes downward movement of the ram bar 6 which is arranged in the lowermost cell, this causing ejection of the carton of cigarettes from the said lowermost cell. During this ejection, the carton is supported by the levers 14 which yield until the carton is resting on the guide plate 53. Only the flaps 28 now remain to be folded, this being effected by the fixed lateral plates 51 while the carton is being moved along the guide plate 53 by means of a ram 198.

*Packing device in detail*

Figure 9:
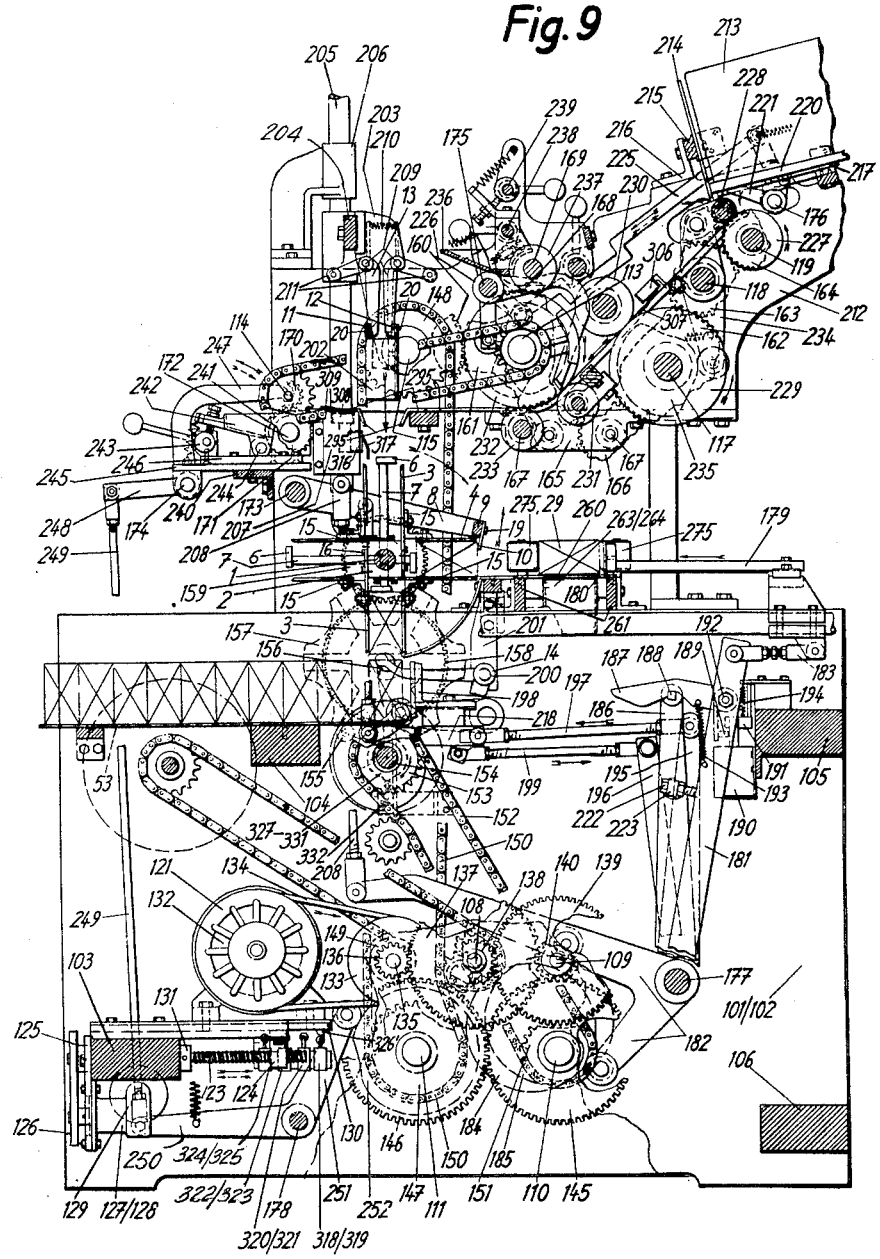
FIG. 9 is a side view, partly broken away and generally similar to FIG. 1, but showing various driving arrangements and auxiliary parts of the packing device.
Figure 10:
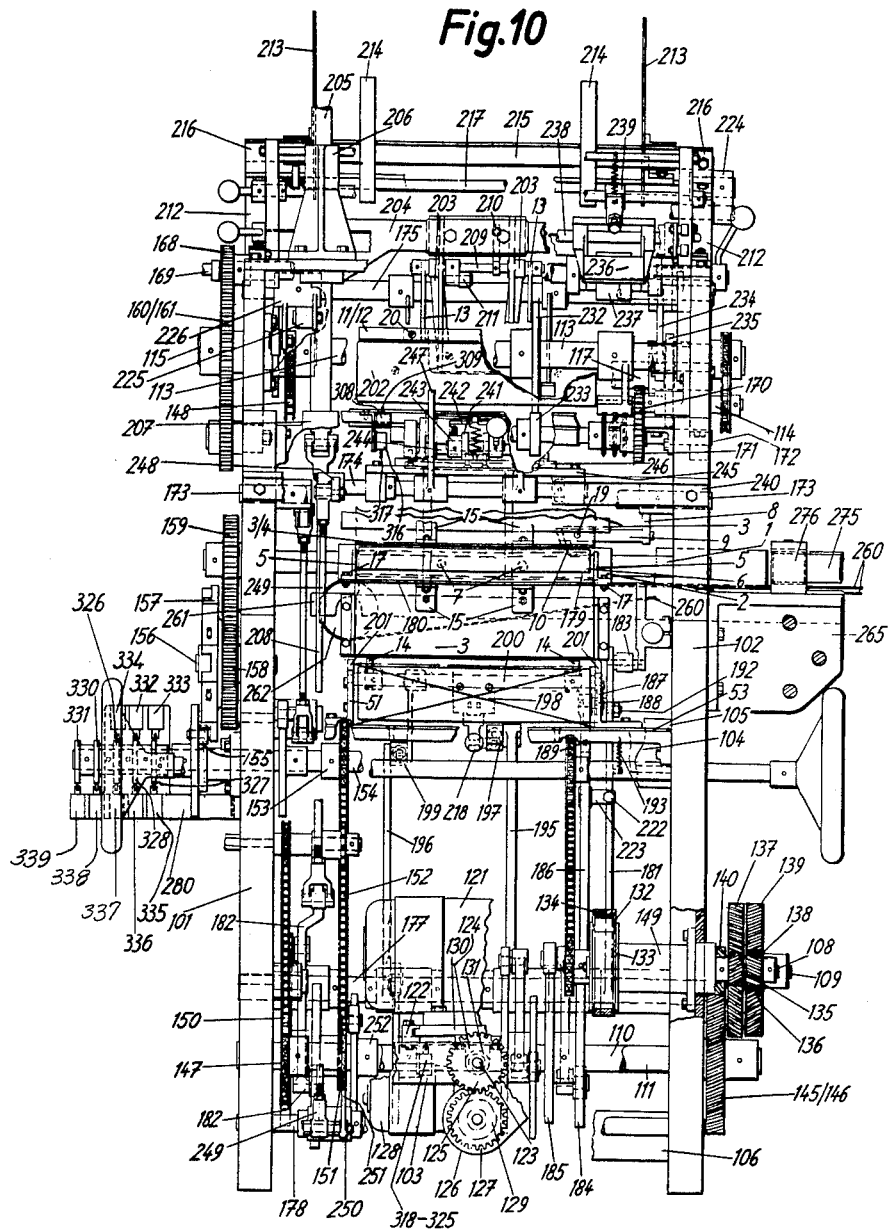
FIG. 10 is an end view, partly broken away, the view being taken from the left hand end of the device as seen in FIG. 9.

Referring now also to FIGS. 9 to 11, the packing device and the operation thereof will be described in greater detail.

The device has two side walls 101 and 102, which are connected together by transverse members 103, 104, 105 and 106. A driving motor 121 is provided on a setting plate 130, movably guided in rails 122 which are secured to the transverse member 103. A threaded spindle 123 is rotatably mounted in the transverse member 103 and engages a nut 124 which is secured to the setting plate 130.

Axial displacement of the spindle 123 is prevented by a stop collar 131 and a toothed wheel 125 secured to the spindle 123, the stop collar 131 and the toothed wheel 125 abutting against opposite sides of the transverse member 103 through which the spindle 123 extends. The toothed wheel 125 is driven by means of a toothed wheel 126 rotatable by a worm gear 129 arranged in a housing 127 of a setting motor 128. The motor 121 carries a cone pulley 132 which drives a cone pulley 133 by means of a V-belt 134, the pulleys 132 and 133 and the belt 134 constituting a known drive system of steplessly adjustable transmission ratio, variation of the transmission ratio being obtained by varying the position of the setting plate 130 by means of the setting motor 128 so as to vary the interaxial spacing between the pulleys 132 and 133. The variation in speed of the pulley 133 is required for enabling variation of the working rate of the packing machine.

The pulley 133 drives a shaft 135 on which it is mounted, the shaft 135 being supported in a bearing 149. The shaft 135 carries a pinion 136 which meshes with a toothed wheel 137 mounted on a shaft 108 which carries a pinion 138. The pinion 138 meshes with a toothed wheel 139 mounted on a shaft 109, and a pinion 140 carried by the shaft 109 meshes with a toothed wheel 145 mounted on a shaft 110, the toothed wheel 145 meshing with a toothed wheel 146 mounted on a shaft 111.

A chain wheel 147 provided on the shaft 111 drives a chain wheel 148 arranged on a shaft 115, by means of a chain 150, the shaft 115 serving as a drive shaft for an arrangement, which will subsequently be described, for drawing carton blanks from a magazine, feeding them to the region above the turret and applying glue to the flaps.

A chain wheel 151 provided on the shaft 110 drives a chain wheel 153 mounted on a shaft 154, by means of a chain 152. An actuating plate 155 is mounted on the shaft 154 and serves for driving a Maltese cross 157 mounted on a shaft 156. A toothed wheel 158 is connected to the shaft 156 and the Maltese cross 157 and meshes with a toothed wheel 159 mounted on the shaft 1 of the turret, thus providing a drive for the said turret.

A toothed wheel 160 provided on the shaft 115 serves for driving a toothed wheel 161 keyed to a shaft 113 which thus is driven. Toothed wheels 162, 163 and 164 (see also FIG. 11), mounted respectively on shafts 117, 118 and 119, are driven by two intermediate toothed wheels 165 and 166 (see FIG. 9) mounted on studs 167, the shafts 117, 118 and 119 thus being driven. The toothed wheel 161 also drives a toothed wheel 168 secured to a shaft 169. A toothed wheel 170 mounted on a shaft 114 meshes with a toothed wheel 171 secured to a shaft 172.

Lever mounting shafts 173, 174 and 175 are provided in the upper portion of the device and, in the lower portion of the device, lever mounting shafts 177 and 178 are provided.

The ram 179, which pushes the cigarette packets 29 into a partly folded carton blank when in the horizontal cell of the turret, is operated by a system of levers 181 and 186 and a pull rod 183 from cam disks 184 and 185 which are secured to the shaft 110. The lever 186 carries a square stud 188 with which a latch 187 cooperates, the latch 187 being mounted on the lever 181 by a pivot 192 and urged into engagement with the stud 188 by a tension spring 193. An adjustable abutment 223 having a setting screw 222 is provided on the lever 186 and abuts against the lever 181. The lever 186 is operated by the cam disks 184 and 185 and the lever 181 is only operated when the latch 187 engages the stud 188, which is normally the case. An electromagnet 190 is provided, however, and if by means of the electromagnet armature 191, the latch 187 is lifted from the stud 188, by engagement of the armature 191 with an extension 189 of the latch 187, the lever 181 is not operated by the cam disks 184 and 185. The electromagnet 190 is fixedly mounted on the transverse member 105 and a tension spring 194 is provided for normally holding the electromagnet armature 191, in its raised, inoperating position.

Levers 195 and 196 are provided on the lever mounting shaft 177, these levers being operable by other cam disks provided on the shaft 110. The lever 195 operates a connecting rod 197 for actuating the discharge ram 198, and the lever 196, through a connecting rod 199, actuates the carton supporting levers 14 which are secured to a lever mounting shaft 200 supported in a bearing member 201.

The ram 202 for inserting a carton blank into the uppermost turret cell is secured by the ram operating arm 203 to a beam 204 which is secured to the operating rod 205.

The operating rod 205 is slidably mounted in an upper bearing block 206 and a lower bearing block 207. The rod 205 is longitudinally reciprocatable by a connecting rod 208 which links the rod 205 to a lever 182 rockably mounted on the shaft 177 and engaging a cam disk arranged on the shaft 110.

The spreading levers 13 are rockably mounted on shafts 209 carried by the ram operating arm 203 and held in the un-spread position by the compression spring 210. In the lowermost position of the ram 202, when the carton blank has been pressed into the U-shaped form in the uppermost cell of the turret, the spreading rails 11 and 12 are moved apart by means of the levers 13, thus folding the flaps 21 and 22 of the carton blank outwardly, as shown in FIG. 3, and thereby facilitating their subsequent inward folding.

Supply of carton blanks

The carton blanks are contained in a magazine having side walls 213, a front wall 214, and a bottom 217. The front wall 214 is secured to a transverse supporting member 215 which is connected by a bracket 216 to fixed side wall portions 212 of the device. A suction arrangement 176 is swingably mounted in the wall portions 212 by means of a pivot 220, and is operable through a lever 224 and a connecting rod 225 by a lever 226 mounted on the shaft 175, the lever 226 engaging a cam disk on the shaft 113.

Sets of rollers 227, 228, 229, 230 and 232, 231, 233 are provided between the side wall portions 212. The rollers 228 are carried by levers 234 rockable about the shaft 118, the lever 234 being in engagement with a cam disk 235 mounted on the shaft 117. The roller 232 functions as a glue application roller having a segmental glue applying area. The roller 232 receives glue from a glue container 236 by means of a glue transferring roller 237 rotatable by the shaft 169. The glue container 236 is rockably mounted on a shaft 238 and the amount of glue transferred therefrom can be regulated by controlling the angular position of the glue container 236 by means of an eccentric 239.

A further glue application arrangement is provided on a transverse frame member 240. In this, a glue transferring roller 241 is mounted on the shaft 172. A glue container 242 is rockably mounted about a shaft 244 and can be adjusted in position relative to the glue transferring roller 241 by means of an eccentric 243. The bearings for the shaft 244 and for the eccentric 243 are provided on a displaceable plate 246, and this plate is provided on a further displaceable plate 245, so that the glue application arrangement forms a movable unit. The shaft 174 is mounted on the plate 245 and carries levers 247 which serve to press the flap 21 of the carton against the glue transferring roller 241 and thus effect the application of glue to the flap 21. The levers 247 are actuated by a lever 248 and a connecting rod 249 from a lever 250 which is rockably mounted on the shaft 178 and has an arm 251 engaging a cam disk 252 provided on the shaft 111.

Conveyor device

A conveyor belt 260 forming part of the conveyor device of FIGS. 12, 13 and 14 is provided which is movable in a direction transverse to the direction of movement of the ram 179, for conveying blocks of cigarette packets 29 above a flat portion of the plate 180 from which the blocks can be introduced into the turret by means of the ram 179. The packets collect against an abutment 143 at one end of the conveyor belt 260. The conveyor belt 260 is entrained on rollers 262 and 263 which are rotatably mounted in a frame 261. The roller 263 is radially displaceable in order to enable tensioning of the belt 260. A further belt entraining roller 264 (see FIGS. 12, 13 and 14) is mounted in a bearing plate 265 and is driven by a chain of toothed wheels 268, 269 and 270 from a shaft 271' carrying a bevel wheel 267, the bevel wheel 267 being driven by a bevel wheel 266 mounted on a drive shaft 271. Two idler rollers 272 are provided for increasing the angular contact area between the belt 260 and the belt driving roller 264. The frame 261 is supported near its end having the roller 263, by a column 274 and a supporting base 273.

At the sides of the conveyor belt 260, endless belts 275 movable in vertical planes are provided, each of these belts 275 being guided by a pair of rollers 276, 277. The rollers 276 of each pair are mounted in the bearing plate 265 and the other roller 277 of each pair is mounted on a bracket 287 which is adjustable in position relative to the frame 261 by means of an adjusting screw 288. Adjusting screws 290 are provided for tensioning the belt 260, the screws acting on the bearings of the conveyor guide roller 263.

At the end of the frame 261 having the guide roller 263, a feed platform 289 is provided for receiving individual packets of cigarettes for feeding onto the conveyor belt 260 by means of a reciprocatably movable ram 279.

The side wall 102 carries a control valve 291 (see FIG. 12), operable by means of an electromagnet 292, the valve serving for controlling the application of suction to the suction arrangement 176 shown in FIGS. 9 and 10. The valve 291 is connected to a vacuum line by a connection 293, and to the suction arrangement 176 by a connection 294.

Detailed operation of packing device and conveyor device

The packing device and conveyor device operates as follows:

The lowermost carton blank (having the form shown in FIG. 5) in the magazine 213, 214, 217 is held at its leading end by the suction arms 221 of the suction arrangement 176, and the suction arrangement 176 is rocked about the pivot 220 to such an extent that the leading end of the carton blank is applied to the rollers 227. The rollers 228, which at this stage are spaced apart from the rollers 227, are swung against the rollers 227 and, since both the rollers 227 and 228 are driven, the gripped carton blank is drawn out of the magazine. The blank then passes through the rollers 229 and 230; and 231, 232 and 233, onto a platform 295, into the position shown in FIG. 1.

The ram 202 is then moved downwards and the blank is thereby pushed into the uppermost cell of the turret, in a U-shaped form, downwardly bent lug portions 295' of the platform 295 assisting in the initial establishment of the U-shaped form. While the carton blank is being pushed into the turret cell, the end flaps 26 and 27 of the blank are folded into the position shown in FIG. 6 by engagement with the brackets 5.

When the ram 202 approaches its end position of movement, the rollers 211 engage against the lower bearing block 207 and thus cause outward movement of the levers 13 and of the spreading rails 11 and 12, with the result that the flaps 21 and 22 of the blank are bent outwardly, in a direction opposite to their subsequent closure direction, into the position shown in FIGS. 4 and 6.

The ram 202 is then moved back into its initial position, shown in FIGS. 1 and 2, and after rotation of the turret by 90° in a clockwise direction as viewed in FIGS. 1, 2, 3 and 9, that is to say into the position shown in FIG. 2, the ram 179 is operated to cause movement of a collected block of packets of cigarettes from the position F on the conveyor belt 260, into the horizontally lying cell of the turret, which now contains a carton blank in U-shaped form, the block of packets thus being inserted into the shaped carton.

The levers 8 are then operated, and the plate 10 engages the carton flap 21 as shown in FIGS. 1 and 3, and folds the flap 21 inwardly into the position shown in FIG. 7.

During the transport of the carton blank from the magazine, the flaps 28 thereof have already had glue applied thereto by means of the glue transfer roller 237 and the segment roller 232, and the flaps 21 have had glue applied thereto by means of the glue transferring roller 241, controlled by the lever 247. The amount of glue applied is such as will hold the flaps securely closed, but nevertheless readily allow intentional separation of the glued flaps when opening the carton. Now on rotation of the turret by one more step of 90°, the flap 22 slides along the curved plate 180 and is folded thereby into an overlying position with relation to the flap 21 and thus adheres thereto. At this stage the turret cell having the carton therein is the lowermost cell of the turret, and the ram 202 is again operated to introduce a fresh carton blank into the cell of the turret which is now uppermost, a blank having already been conveyed to the platform 295 for this purpose in the same manner as described above. When now the ram 202 is operated, it engages the ram bar 6 in the said uppermost cell and thus, by means of the rods 7, causes the ram bar 6 in the lowermost cell to eject the carton of cigarettes therefrom. The ejected carton is supported by the levers 14 which move downwardly from the position shown in FIG. 9 into the position shown in FIG. 4, the levers 14 holding the flap 22 closed against the flap 21 until the carton reaches the guide plate 53 (FIGS. 4 and 9). The ram 198 is then operated to push the ejected carton further along the guide plate 53, the carton pushing before it cartons which have previously been ejected from the turret, the cartons being then taken from the guide plate 53 by hand or by known mechanical removal means (not shown).

The lateral plates 51 at the sides of the guide plate 53 in the region thereof which is in the vicinity of the turret, engage the glued flaps 28 of the carton blank, while the ejected carton is being pushed along the guide plate 53 by the ram 179, the indenting plates 52 having first been moved into engagement with the flaps 28 to indent folding lines therein, and on movement of the carton, the flaps 28 are folded over into glued engagement with the already folded end flaps 26 and 27.

Now, as will be seen from FIG. 12, the conveyor arrangement is supplied with packets of cigarettes in the direction of the arrow shown at the right hand side of FIG. 12, for conveying to the packing device. This supply of packets is effected by a conveyor belt 281 and, as shown, four columns of packets, each column stacked two packets high, are carried by the belt 281, each column representing the output from one cigarette packing machine, that is to say a machine packing a plurality of cigarettes into an individual packet. Of course, any number of cigarette packing machines may be used, the conveyor belt 281 being of a width appropriate to the number of machines used.

Since the output rate of cigarette packing machines is not constant, it is desirable to provide means for regulating the working rate of the packing device already described, that is to say the device for packing packets of cigarettes into cartons. This regulation is effected by means of the continuously variable transmission between the driving motor 121 (see FIG. 9) and the turret, which comprises the pulleys 132 and 133 and the V-belt 134, and which is controlled from the setting motor 128 by means of the elements 125, 126, 127, 123, 124, 131 and 130. At the same time the vacuum control valve 291 is controlled by means of the electromagnet 292 and operation of the locking electromagnet 190 for the ram 179 is controlled.

*Relationship of control arrangement to packing and conveyor devices*

For controlling the above mentioned regulation three microswitches 300, 302 and 304 are arranged above the conveyor belt 260, the micro-switches respectively having operating feelers 301, 303 and 305 which extend into the path of movement of packets on the conveyor belt 260 to such an extent as to cause operation of the respective micro-switch when a cigarette packet engages one of the feelers in passing under the same.

Referring now to FIGS. 12 and 13, it will be seen that the ram 279, which is operated in timed relation to the stepwise rotation of the turret of the packing device, pushes the endmost row 282 of packets from the conveyor belt 281 onto the conveyor belt 260 which runs transversely thereto, the block of eight packets (four packets wide and two packets high) assuming a position 283 on the conveyor belt 260. Since the ram 279 always moves into the same end position with respect to the conveyor belt 260 when pushing packets thereonto, the number of groups of two packets present at the position 283 at the instant when the ram 279 is in the position 279' shown in FIG. 13, is a measure of the operating rate of the packing machines supplying the conveyor belt 281 and of the packing rate at which the packing device having the turret must operate. These groups of two packets will hereinafter be referred to simply as packets.

At the position 283, three micro-switches 310, 312 and 314 are provided, that is to say one less than the number of packing machines supplying the conveyor belt 281. The micro-switches respectively have feelers 311, 313 and 315, arranged for operating the respective switches when engaged by packets in the position 283. The first micro-switch 310 is arranged above the position of the first packet at the position 283, the second micro-switch 312 above the position of the second packet and the third micro-switch 314 above the position of the third packet. The position of the fourth packet, that is to say the position immediately adjacent to the ram 179 when in the position 179' has no micro-switch, since if a packet is missing from any one of the columns of the conveyor 281, a packet will in any case be present in the normal position of the fourth packet, so long as at least one of the columns of the conveyor 281 has a packet for engagement by the ram 279. If the three micro-switches 310, 311, 314 are operated by their respective feelers, then four packets are present at the position 283; if two of the micro-switches are operated, then one packet is missing, if only one of the micro-switches is operated, then two packets are missing and if none of the micro-switches is operated then three packets are missing from the position 283.

As will be described below, the rate of working of the packing device having the turret, is controlled in dependence on the number of packets present at the position 283 on the conveyor belt 260. In exceptional circumstances it may occur that none of the columns of the conveyor belt 281 contains a packet for delivery to the position 283. In such a case, however, the packing device is not brought to rest as the danger would exist of the glue drying on the glue transferring rollers. The absence of all four packets from the position 283 is, however, very exceptional.

As explained above, the three micro-switches 310, 312 and 314 determine the working rate of the packing device. If only three packets are sensed at the position 283, the working rate of the packing device must be reduced to 75% of normal and if only two packets are sensed at the position 283, the working rate of the packing device must be reduced to 50% of normal, this being effected by control of the continuously variable transmission 132, 133 and 134, by displacement of the setting plate 130 (see FIG. 9) by means of the setting motor 128. The setting plate 130 has four predetermined positions corresponding to full speed, three quarter speed, half speed, and one quarter speed, of the drive transmitted by the continuously variable transmission, and these positions of the setting plate 130 are respectively positions in which a projection 326' on the setting plate actuate limit switches 324, 322, 320 and 318, having feelers 325, 323, 321 and 319 engageable by the said projection 326'.

Figure 16:
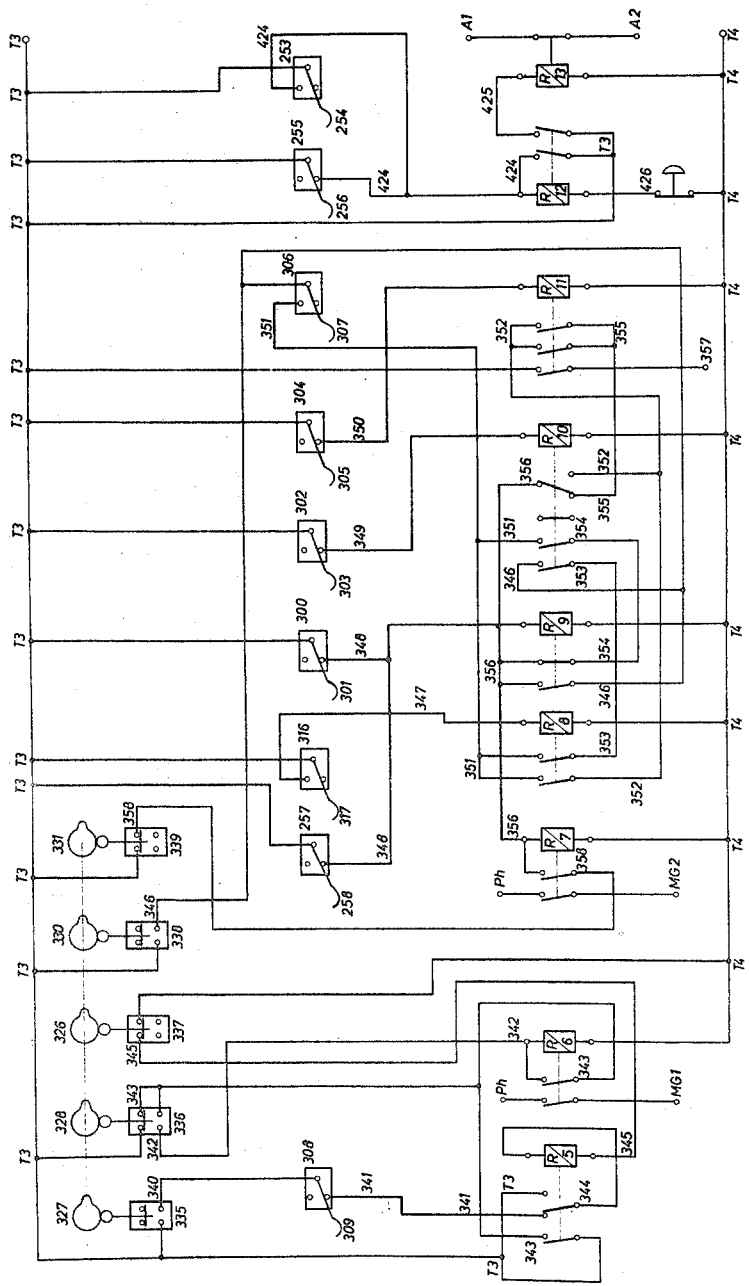

The electrical circuit of the entire control arrangement is shown in FIGS. 15 and 16. As will be seen from the subsequent description of the control arrangement, when one or more of the micro-switches 310, 312 or 314 is operated, the setting motor 128 is operated until the projection 326' on the setting plate 130 has operated the limit switch 324, 322, 320 or 318 corresponding to the required percentage of normal operating speed of the packing device.

In order that the packing device can continue to run if no packets are fed, and in order to ensure that idling of the packing device and re-commencement of operation thereof is effected in a satisfactory manner in such a case, the three micro-switches 300, 302 and 304 are provided, these being arranged above the conveyor belt 260 in predetermined positions. It has been found desirable to have present on the conveyor belt 260 at any given time, twice the number of packets as are required for one carton. Accordingly, at a distance spaced from the abutment 143 at the left hand end of the conveyor belt 260, as viewed in FIGS. 12 and 13, by an amount equal to the total width of eight packets, the micro-switch 300 is provided. Thus if less than eight packets are present in close succession on the conveyor belt 260, counting from the left hand end thereof, the feeler 301 of the micro-switch 300 drops and, as will be later described with reference to FIG. 16, the electromagnet 190 is energized and the ram 179 thus prevented from operating, so that no packets are pushed into the turret and the turret thus runs idle. This condition is prepared for by the micro-switch 304 which is spaced back along the conveyor belt 260 from the micro-switch 300 by twice the length of the block of packets which corresponds to one carton. The reason for this is that in normal operation of the packing device there are always two carton blanks en route to the station where packets are inserted into the turret, and in order to prevent blockages, these two carton blanks must in all cases be used. The micro-switch 304 is thus spaced so far from the delivery end of the conveyor belt 260 that at any time at least as many packets have passed under it, but have not yet been engaged by the ram 179, as are required for two cartons. If after the feeler 305 of the micro-switch 304 has dropped, no further packets are fed by the conveyor belt 260 past the micro-switch 304, then subsequently the feeler 303 of the micro-switch 302 will drop and then the feeler 301 of the micro-switch 300.

Now, if reference is made to FIGS. 1 and 9, there will be seen three micro-switches 306, 308 and 316, respectively having feelers 307, 309 and 317 arranged in the feed path of the carton blanks to the turret. These microswitches are for enabling the feed of carton blanks to be re-established when packets are again being fed to the packing device after an interruption. Only when the condition of the micro-switches 306, 307 and 308 is such as corresponds to the absence of a carton blank from the feed path between the carton blank magazine and the turret, can the feeding of a fresh carton blank be established, one carton blank being fed for each block of packets fed along the conveyor 260, the micro-switch 304 serving for controlling the application of vacuum to the suction arms 221.

Idling of the packing device takes place as follows:

The feeler 305 of the microswitch 304 drops, at which stage two carton blanks and two blocks of packets are still on the way to the packing position. Now, the blocks of packets are fed to the packing device with a periodic rhythm, whereas the carton blanks are fed to the microswitch 308 at a constant speed. For the sake of safety, the control of the feed of carton blanks is divided between two micro-switches, that is to say the micro-switch 308 and the micro-switch 306, which are so spaced that if the feeler 304 of the micro-switch 305, arranged above the conveyor belt 260, drops, then the carton blank being fed is either in engagement with the micro-switch 306 or 308 and the vacuum connection to the suction arms 221 is interrupted by operation of the electromagnet 292. Again, if the feelers 302 and 304 of the micro-switches 303 and 305 have fallen, then the carton being fed is either in engagement with the micro-switch 306 or 308 and the vacuum connection to the suction arms 221 is again interrupted. If the feelers 301, 303 and 305 of the three micro-switches 300, 302 and 304 have fallen, then the vacuum connection to the suction arms 221 remains permanently interrupted.

As soon as the feeler 301 is lifted by the passage thereunder of a packet, then a carton blank is not in engagement with the micro-switches 306 and 308 and the vacuum connection to the suction arms 221 is established by de-energization of the electromagnet 292 which controls the valve 291. It will be appreciated that the vacuum connection to the suction arms 221 is controlled both in dependence on the presence of packets on the conveyor belt 260 and in dependence on the presence of carton blanks in the feed path therefor.

The variation in the working speed of the packing device, which is effected in dependence on the condition of the micro-switches 310, 312 and 314, only becomes effective when the feeler 305 of the micro-switch 304 has dropped. It is thereby prevented that the control of the working speed of the packing device is initiated on the occurrence of small fluctuations in the supply of packets for packing, but it is nevertheless ensured that idling of the machine is initiated without fail, when required.

The vacuum control valve 291 must be operated to interrupt the vacuum connection to the suction arms 221 when the said arms 221 are in a definite neutral position and the latch 187 must be operated to secure the ram 179 when the ram is in its withdrawn end position. For allowing such timed operation, switching cams 326, 327 and 328 are provided, which are driven in timed relation to the variable speed drive of the packing device and ensure that the switching of the electromagnets 292 and 190 is effected at the appropriate time during the movement of the suction arms 221 and the ram 179. The switching cams 326, 327 and 328 are provided on an extension of the shaft 151 (see FIG. 10, left hand side) and cooperate with switches 334, 333 and 332 respectively, arranged on a bracket 280 secured to the side wall 101.

Referring now in greater detail to FIG. 15, there will be seen at the right hand side three terminals leading respectively to wires T1, T3 and T4. The steplessly variable transmission used in the packing device is of such a kind that can only be varied in ratio during running. Thus, relay windings S1 and S2 shown in FIG. 15, and which are provided for switching the setting motor 128 (FIG. 9) for forward or backward running respectively, are so arranged as to receive operating voltage only after a relay (not shown) controlling the main driving motor 121 (see FIG. 9) has been energized, the operating voltage for the relay winding S1 or S2 being received from the wire T1. The analogous wire, which receives voltage regardless of the condition of the relay controlling the main driving motor 121, is T3. Between wire T1 or T3 and wire T4, a voltage of 24 volts is applied, this serving as a control voltage for operation of the various relays, electromagnets and lamps in the arrangement.

Four relays are shown in FIG. 15. Relay R1 is operated when it is required for the packing device to operate at 75% of its normal working speed, relay R3 is operated when the packing device is required to operate at 50% of its normal speed, and relay R4 for 25% of normal speed, the relays thus corresponding with the respective micro-switches 322, 320 and 318. R2 is a control relay which is operated by the micro-switch 310 and is arranged for preparing a circuit which is effective only when relay R1 is energized by dropping of the feeler 305 of the micro-switch 304. Only when relay R2 has prepared the circuit does relay R1 respond, effecting regulation of the working speed to 75% of its normal full speed. Thereafter, for further regulation down to 50% and 25% of normal full speed, the feeler 305 of the micro-switch 304 will, of course, remain in its unsupported condition.

The circuit of FIG. 15 will now be described with reference to the various degrees of regulation possible.

For regulation of the working speed of the packing device to 75% of the normal full working speed, an initial requirement is that the feeler 311 of the micro-switch 310 drops. Thus, a contact leading to wire 401 of the micro-switch 301 is connected to the wire T3. A contact leading to wire 401 of the micro-switch 301 is also connected to a contact leading to wire 401 of the switch 332 which is a single pole two-way switch. When not operated by the cam 328, the contact of the switch 332, which leads to wires 401 and T3, are bridged and the contact of said switch, which leads to wire 402 and is connected thereby to a contact of relay R2, is open. Consequently, until the cam 328 operates the switch 332, the dropping of the feeler 311 has no effect. If a packet is in its normal position underneath the micro-switch 310 then the contact leading to the wire 401 of the switch 332 is not connected to wire T3 by the switch 310 and thus when the lobe of the cam 328 operates the switch 332 to connect the contact leading to the wire 401 thereof to the contact leading to the wire 402 no connection is made between the contact leading to the wire 401 of the switch 332 and the wire T3. If, however, a packet is not present underneath the micro-switch 310, then the contact leading to the wire 401 of the switch 332 is connected to the wire T3 and on operation of the switch 332 the contact leading to the wire 402 thereof is connected to the wire T3 so that thus the relay R2, one terminal of which is permanently connected to the wire T4, is energized for the duration of the operation of the switch 332, that is to say for about one eighteenth of the time of one revolution of the cam 328. Relay R2 has a self-holding contact which connects wire 402 to wire 401 and thus when the switch 332 is changed over by the cam 328 moving out of range, the relay R2 does not lapse. Relay R2 can only lapse if the feeler 311 of the micro-switch 310 is engaged by a cigarette packet at the same time that the switch 332 is changed over by movement of the cam 328 into range. In any case, if the feeler 311 has dropped, R2 remains energized, but initially has only the function of preparing a circuit between the wire T4 and the wire 422 leading to the relay R1.

Relay R1 is energized by the connection of wire 357 to the wire T3 by a relay R11 (see FIG. 16) which is connected across the wires T3 and T4 in series with the micro-switch 304. By means of contacts leading to wires 409 and 408 of relay R2 and contacts leading to wires 408 and T4 of relay R1, a current circuit for the relay winding S2 is established and the setting motor 128 is thus caused to rotate in a direction such as to move the projection 326' of the setting plate 130 towards the sensing roller 323 of the limit switch 322. As soon as the projection 326' has displaced the sensing roller 323 of the limit switch 322, the connection between contacts leading to wires 411 and 412 of the limit switch 322 is interrupted and the relay winding S2 is de-energized, the 75% position having been reached.

If the deficiency in supply of packets is overcome and packets are again supplied to the conveyor belt 260 in the full amount, then both feeler 311 and feeler 305 are lifted by the passage of packets thereunder. Thus relay R1 lapses and also relays R2 and R11. The relay winding S1 is at this stage connected to wires T1 and T4 through the contacts leading to wires 419 and 420 of the limit switch 324, and contacts leading to wires 419 and T4 of relay R2. Consequently the setting motor 128 is operated in the forward direction, moving the setting plate 130 towards the left as viewed in FIG. 9, until the projection 326' on the setting plate 130 engages the sensing roller 325 of the limit switch 324 and thus interrupts the connection between the contacts leading to wires 420 and 419 thereof. The 100% position has thus been reached.

In considering regulation to 50% of full normal working speed, it will be assumed that regulation has first been effected to the 75% position, although if regulating direct from the 100% position to the 50% position the 75% position would in any case be passed through without however a pause being made at the 75% position.

The requirement for regulation to the 50% position is the dropping of the feeler 313 of the micro-switch 312. Of course, in such a case the feeler 311 also drops or has in fact already dropped, as also the feeler 305 of the micro-switch 304. The rotating cam 327 thereafter lifts the contact bridge of the switch 333, which is a single pole two way switch, and causes closure of contacts leading to wires 403 and 404 thereof. Relay R3 is thus energized and remains held by its self-holding contacts leading to wires 403, 404, as long as the feeler 313 is not lifted by passage of a packet thereunder. If the feeler 313 is lifted, then the connection of contacts leading to wires 403 and T3 by the switch 333 maintains the circuit to the relay R3. Since the connection between the contacts leading to wires 403 and T3 of the switch 333 is interrupted by passage of the cam 327 out of range, R3 would then lapse at a predetermined instant. If however, the feeler 313 remains in the dropped condition and the relay R3 thus remains energized, the relay winding S2 is energized through the closed contacts leading to wires 408 and 413 of the relay R3 by the potential between lines T1 and T4. The setting motor 128 thus rotates in the backward direction until the projection 326' of the setting plate 130 engages the sensing roller 321 of the switch 320 and thus causes interruption of the connection between contacts leading to wires 413 and 414 thereof. The setting plate 130 then remains in this position, which is the desired 50% regulation position.

Return regulation to the 75% position is effected when the feeler 313 is lifted and relay R3 lapses, the circuit to the relay winding S2 then being established from contacts leading to wires 408 and 412 of relay R3, contacts leading to wires 411 and 412 of switch 322, contacts leading to wires 419 and 411 of relay R1, contacts leading to wires 419 and 420 of switch 324. When regulating back to the higher percentage, the relays R1 and R2 remain energized until the 100% position is reached, this requiring that the feeler 311 is lifted by the presence of a packet thereunder.

For regulation of the working speed of the packing device down to 25% of its normal full working speed to be required, the feeler 315 will have dropped, so that now all of the feelers 311, 313 and 315 will be in the dropped condition. The relay R4 is energized through the connection of contacts leading to wires 405 and T3 of the micro-switch 314, as soon as the cam 326 has caused the bridge of the switch 334 to form a connection between contacts leading to wires 405 and 406 of the switch 334. The relay R4 is additionally held through self-holding contacts leading to wires 405 and 406 thereof as soon as the cam 326 moves out of range of the switch 334 and allows the bridge of the switch to connect contacts leading to wires 405 and T3 thereof, the procedure being the same as described for relay R3. The relay winding S2 is then energized through a current circuit extending from terminals leading to wires T1 and T4 through contacts leading to wires 417 and 414 of switch 318, and contacts leading to wires 414 and 408 of relay R4. Thus the setting motor 128 is operated and displaces the setting plate 130 to such a position that the projection 326' thereof engages the sensing roller 319 of the limit switch 318 and interrupts the connection therein between contacts leading to wires 414 and 417. The current circuit of the relay winding S2 is thus interrupted and the setting plate 130 remains in the 25% regulation position.

Regulation back to a faster working rate for the packing device is initiated when the feeler 315 is lifted by the presence of a packet thereunder. The connection between contacts leading to wires 405 and T3 thereof is then interrupted and the relay R4 lapses. The relay winding S1 is then energized through a current circuit extending from contacts leading to wires 420 and 419 of the limit switch 324, contacts leading to wires 411 and 419 of relay R1, contacts leading to wires 411 and 412 of limit switch 322, contacts leading to wires 415 and 416 of switch 320 and contacts 416 and 408 of relay R4. The setting motor 128 is thus operated in the forward direction until the projection 326' on the setting plate 130 engages the sensing roller 321 of the switch 320 and interrupts the connection between the contacts leading to wires 415 and 416 thereof, thus stopping the setting motor at the 50% position. Further regulation back to the 75% and 100% positions is effected as already described.

A switch 500 is provided in the wire T4 of FIG. 15. This switch enables an overriding manual control of the working speed of the packing device to be exercised. If the packing device is running at normal full speed, and the button — of the switch 500 is depressed, the relay winding S2 is energized and the setting motor 128 thus operated for displacing the setting plate 130 towards the right as viewed in FIG. 15. As soon as the button — is released, the setting motor 128 returns the setting plate 130 to the 100% position, or to whatever position is dictated by the automatic control procedure taking place. A similar action takes place when the button + of the switch 500 is pressed. Moreover, the switch 500 enables an entirely manual control of the working speed of the packing device to be effected, if the automatic control apparatus is out of operation.

At the left hand side of FIG. 10, five cams 326, 327, 328, 330 and 331 are shown. The cams 326, 327 and 328 are the same as those referred to above in connection with FIG. 15, and cooperate with the switches 334, 333 and 332 respectively. The cams 326, 327 and 328 also cooperate with other switches 337, 336 and 335 shown in FIGS. 10 and 16. Moreover, the cams 330 and 331 cooperate with switches 338 and 339 as shown in FIGS. 10 and 16.

Now, in the circuit diagram of FIG. 16 there will be seen a relay R6 having a contact set which on energization of the relay R6, forms a connection between a current source Ph and a terminal MG1 connected to the electromagnet 190 which controls latching of the ram 179. When the packing device is first started up it must run idle for one working cycle, as otherwise the ram 179 would introduce packets into the turret before the correct insertion of a carton blank into the turret has been effected, this being because the relay R6 has not been energized for initiating latching of the ram 179. Thus the micro-switch 308 is arranged as shown in FIG. 16, so that if a carton blank has not operated the micro-switch 308, then when the switch 335 is actuated by the cam 327 to form a connection between wire T3 and the contact leading to the wire 340, the micro-switch 308 forms a connection between the contact leading to the wire 340 and its contact leading to the wire 341, causing relay R5 to be energized, the relay R5 being self-holding through the connection T3–344. At the same time the relay R5 forms the connection T3–343 and subsequently, by means of the cam 328 the connection 343–342 is formed by the switch 336 and the relay R6 is thus energized. Since the connection T3–343 is maintained by the relay R5, relay R6 remains energized when the cam 328 moves out of range of the switch 336.

Relay R6 initiates latching of the ram 176 and thereafter the relay R5 is released by the cam 326 actuating the switch 337 and thus interrupting the connection T4–345 formed thereby. Relay R6 remains held until the cam 328 again actuates the switch 336 and thus interrupts the connection T3–343 formed thereby. It will therefore be appreciated that in no case are packets pushed by the ram 179 into the turret during an operating cycle in which the micro-switch 308 is not actuated by a carton blank.

Now if a carton blank has not actuated the micro-switches 306 and 316, and if packets are not present beneath the micro-switches 300, 302 and 304, on the conveyor belt 260, then it is required that the feed of carton blanks from the carton blank magazine be interrupted. The micro-switch 338 shown in FIG. 16 serves for controlling interruption of the vacuum connection to the suction arms 221 (see FIG. 9), and is operated at the appropriate time in the operating cycle of the packing device, by the cam 330. When operated, the switch 338 forms the connection T3–346 and since relay R9 has already been energized by the micro-switch 300 the connection 346–356 formed thereby completes the energizing circuit to relay R7. When relay R7 is energized, a connection is formed thereby between a current source Ph and a terminal MG2 connected to the electromagnet 292 (see FIG. 12) which operates the valve 291 and interrupts the vacuum connection to the suction arms 221.

If during the operative time of the cam 330, a packet happens to be beneath the micro-switch 300, the relay R7 would lapse and the vacuum to the suction arms 221 would be re-established. In such a case, if further packets were not present subsequent to the packet beneath the micro-switch 300, the conveyor belt 260 would run empty. In order to prevent this, a micro-switch 257 having a feeler 258 is provided above the conveyor belt 260 at a region spaced by one and a half times the length of a packet from the micro-switch 300, in the direction towards the abutment 143. As can be seen from FIG. 15 the micro-switch 257 is connected in parallel with the micro-switch 300.

When packets are fed to the conveyor belt 260 it may happen that a packet assumes an end-on position rather than lying parallel to the conveyor belt 260. In order to stop the machine in such a case, a micro-switch 253 having a feeler 254 is arranged over the conveyor belt 260 at a region between the micro-switch 257 and the ram 179. As can be seen from FIG. 16, the micro-switch 253 closes a connection T3–424 to a relay R12 for energizing the same, when the feeler 254 of the micro-switch 253 is lifted to its maximum extent, as would occur on the presence of an end-on packet thereunder. The relay R12 is connected by a connection 426 and a manually operable interrupting switch, to T3 and has a normally open self-holding contact set and also a normally open contact set which when closed connects a relay R13 between T3 and T4 by a connection 425. The relay R13 has a normally closed contact set bridging terminals A1 and A2 which are connected in series with a power supply to the machine. Consequently on lifting of the feeler 254 of the micro-switch 253 to a sufficient extent, relay R12 is energized, this causing relay R13 to be energized and thus the power supply to the machine interrupted. When it is desired to restore the power supply to the machine, the interrupting switch in series with connection 426 is opened, thus allowing the relay R12 to lapse, with consequent opening of the self-holding contact set thereof.

In order to prevent the packets of the block F of FIG. 12 from being acted on by the ram 179 if no packets immediately prior to the packets shown in FIG. 12 are present on the conveyor belt 260, a micro-switch 255 having a feeler 256 is arranged above the conveyor belt 260 in a position for sensing the presence of a packet immediately prior to the packets which are acted on as a block by the ram 179. As can be seen from FIG. 16, the micro-switch 255 is connected in parallel with the micro-switch 253 and, when the feeler 256 falls, the relay R13 is energized and the machine stopped.

If, after an interruption in the feed of packets to the conveyor 260, packets are again fed for packing, and operate the micro-switch 300, the connection T3–348 is opened thereby and relay R9 lapses, the connection 356–346 being interrupted thereby and a connection 356–354 formed. Relay R7 then lapses after approximately 300° rotation of the cam 331, when the lobe thereof actuates the switch 339 and thereby interrupts a connecton T3–358 normally formed by the switch 339. On lapsing of the relay R7 at this predetermined time instant, the electromagnet 292 is de-energized and the vacuum connection restored to the suction arms 221. The carton blank then engaged by the suction arms 221 actuates the micro-switch 306 which thereby forms a connection 346–351. Since, however, only the micro-switch 301 at the conveyor belt 260 has been actuated, relay R9 remains unenergized. The carton blank then passes to the micro-switch 316 and causes the connection T3–347 to be formed thereby, so that relay R8 is energized and forms the connections 351–352 and 351–353. Now at this stage no packets are present on the conveyor belt 260 and therefore relay R10 is in the energized condition, due to the micro-switch 302. The same applies to relay R11. Thus by relay R10 the connections 346–353, 351–354 and 356–352, are formed and by relay R11 the connections 352–355 and T3–357. Due to the connection 351–353 formed by relay R8, the connection 351–354 formed by relay R10 and the connection 354–356 formed by relay R9, relay R7 is energized and forms the connection P$h$–MG2 for the electromagnet 292 of the vacuum valve 291, so that no further carton blanks are fed from the magazine.

The control of the vacuum valve 291 is thus effected in such a manner that the following four operational cases arise:

(1) If a carton blank is not in engagement with the micro-switches 316 and 306 and packets of cigarettes are not in engagement with the micro-switches 300, 302 and 304, then no carton blanks are removed from the magazine.

(2) If only the micro-switch 300 is engaged by a packet, then one carton is fed from the magazine and for the two successive operating cycles, no carton blanks are fed from the magazine.

(3) If the micro-switches 300 and 302 are engaged by packets, then carton blanks are fed for two cycles, followed by an absence of a carton blank for the next cycle.

(4) If the micro-switches 300, 302 and 304 are engaged by packets, then carton blanks are fed for all operating cycles.

It will be appreciated that the packing machines supplying the conveyor belt 281 will vary in output and that variations in the number of packets present on the conveyor belt 260 will thus occur. Such variations are in many cases only of short duration and it is desirable to provide means whereby variation of the speed of operation of the packing device is effected only after a drop in the number of packets fed to the conveyor belt 260 has existed for a predetermined time, for example 5 to 10 seconds.

In order to achieve this, the circuit arrangement shown in FIG. 15 may be modified as shown in FIG. 17. In this figure, for the sake of simplicity, the relay R1 and its connection to relay R2 so that relay R2 can be effective only when the feeler of micro-switch 304 (see FIG. 16) has dropped, is not shown. The energization of the respective relays R2, R3 and R4 are the same as described for FIG. 15, and will not be further described. Also, the operation of the switches 318, 320, 322 and 324 is the same as described for FIG. 15.

Relay R2, which is energized when it is required to operate the packing device at 75% of its normal working speed, has a normally open contact set which, when closed, forms a connection T3′–429 to a time relay Z1 which is connected to T4′ (T3′ and T4′ corresponding to T3 and T4 in FIG. 15). The time relay Z1 has a double-throw contact set which, when the time relay Z1 is not energized, or up to a given time after energization, forms a connection T4′–419 to the switch 324 so that the packing device continues to operate at its normal working speed. If, before the expiration of the said given time, the micro-switch 304 is operated by the presence of a packet thereunder, the relays R2 and Z1 are de-energized and thus the contact set of the time relay Z1 remains in its normal position. If, however, at the expiration of the given time, say 10 seconds, the micro-switch 304 has not been operated, then the time relay Z1 remains energized and its contact set is changed-over into a position in which a connection T4′–409 is established to the switch 322, so that regulation down to a speed of 75% of normal speed is effected.

Similarly, relay R3 is energized when regulation down to 50% of normal speed is required and relay R2 when regulation down to 25% of normal speed is required. Relay R3 has a contact set which forms a connection T3′–430 to a time relay Z2 and relay R4 has a contact set which forms a connection T3′–431 to a time relay Z3. Time relay Z2 has a double-throw contact set which in the normal position forms a connection T4′–412 to the switches 322 and 320 and in the off-normal position forms a connection T4′–413 to the switch 320. Time relay Z3 has a double-throw contact set which in the normal position forms a connection T4′–416 to the switch 320 and in the off-normal position forms a connection T4′–414 to the switch 318.

It should be clearly understood that the embodiment described hereinbefore with reference to the attached drawings is given by way of example only, and that many modifications are possible without departing from the spirit of the invention.

I claim:

1. A device for packing a plurality of articles into cartons, comprising a rotatable turret, a plurality of cells in said turret, means for successively inserting carton blanks directly into said cells, one into each, the surface area of each of said carton blanks being greater than the cross-sectional area of one of said cells whereby each carton blank on insertion is bent into U-shape, movable means for pre-folding outwardly end portions of each carton blank after its insertion into one of the cells to weaken and thereby to facilitate subsequent inward folding of said end portions, means for introducing articles into the U-shaped carton blanks while in said cells, means for inwardly folding said end portions after the articles have been introduced, and means for ejecting said U-shaped carton blanks together with the articles therein from said cells, said inserting and prefolding means comprising a reciprocatable ram movable into and out of the cells for inserting carton blanks therein, levers respectively having main arms and arranged for being carried along with said ram, abutments engageable with said levers when said ram approaches its deepest position within a cell to pivot said levers and spread said main arms of said levers from one another, and rail-like members carried by said main arms and arranged to engage end portions of the carton blanks to pre-fold the same outwardly on spreading of said main arms of said levers.

2. In a device for packing a plurality of articles into cartons, the combination of a rotatable turret, a plurality of cells in said turret, a reciprocatable ram movable into and out of said cells for inserting carton blanks directly therein and bending each carton blank on insertion into U-shape, levers arranged for being carried along with said ram, abutments engageable with said levers when said ram approaches its deepest position within a cell so as to pivot and to spread said levers from one another, and means carried by said levers and arranged to engage end portions of each carton blank to pre-fold the same outwardly on spreading of said levers.

3. A combination as defined in claim 2, and further comprising a rotatable shaft, first fixing means, and second fixing means, each of said turret cells comprising a first wall and an opposing second wall, only said first wall of each cell being directly fixed to said shaft by said first fixing means, said second wall of each cell being directly fixed by said second fixing means to one of said first walls.

References Cited by the Examiner
UNITED STATES PATENTS

| | | | |
|---|---|---|---|
| 1,331,590 | 2/1920 | Shotwell | 53—225 X |
| 1,352,232 | 9/1920 | Weightman | 53—225 X |
| 1,543,296 | 6/1925 | Peters et al. | 53—234 |
| 1,931,440 | 10/1933 | Jahne | 53—141 |
| 2,277,877 | 3/1942 | Malhoit | 53—194 |
| 2,603,047 | 7/1952 | Malhoit | 53—234 X |
| 2,835,087 | 5/1958 | Engleson et al. | 53—63 |

TRAVIS S. McGEHEE, *Primary Examiner.*

A. E. FOURNIER, *Assistant Examiner.*